United States Patent
Kataria et al.

(10) Patent No.: US 10,225,225 B2
(45) Date of Patent: Mar. 5, 2019

(54) COGNITIVE AND CONTEXT DRIVEN NOTIFICATION GENERATION ON A COLLABORATIVE PLATFORM

(71) Applicant: International Business Machines Corporation, Armonk, NY (US)

(72) Inventors: Manish Kataria, Delhi (IN); Nihar Tiku, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/138,299

(22) Filed: Apr. 26, 2016

(65) Prior Publication Data

US 2017/0310626 A1    Oct. 26, 2017

(51) Int. Cl.
    *H04L 12/58*    (2006.01)
    *H04W 4/21*     (2018.01)

(52) U.S. Cl.
    CPC .............. *H04L 51/24* (2013.01); *H04W 4/21* (2018.02)

(58) Field of Classification Search
    CPC .......... H04L 51/24; H04L 51/36; H04L 67/10; H04L 67/306
    See application file for complete search history.

(56) References Cited

U.S. PATENT DOCUMENTS

| 7,613,732 | B2  |   | 11/2009 | Oh |  |
|---|---|---|---|---|---|
| 8,014,806 | B2 |   | 9/2011 | Mock et al. |  |
| 8,437,779 | B2 | * | 5/2013 | Phukan | G06F 17/3087 455/404.2 |
| 2006/0242234 | A1 |   | 10/2006 | Counts et al. |  |
| 2012/0265433 | A1 | * | 10/2012 | Viola | G01C 21/3617 701/410 |
| 2013/0268490 | A1 | * | 10/2013 | Keebler | G06F 17/30575 707/627 |
| 2014/0025752 | A1 |   | 1/2014 | DeLuca et al. |  |
| 2014/0304350 | A1 |   | 10/2014 | Rana et al. |  |
| 2015/0379615 | A1 | * | 12/2015 | Dhar | G06Q 30/0633 705/26.8 |
| 2016/0239497 | A1 | * | 8/2016 | O'Donnell | G06F 17/30867 |

OTHER PUBLICATIONS

Wikibooks, "Breadth-first search", Apr. 7, 2015, Wikibooks.org, 2 pages.*
IBM et al., "A Directory-assisted e-mail System", An IP.com Prior Art Database Technical Disclosure, Original Publication Date: Sep. 15, 2002, IP.com No. 000016170, 2 pages.
"Dynamic and compact tagging of a group of users in social network posts", An IP.com Prior Art Database Technical Disclosure, IP.com No. 000243021, 3 pages.

* cited by examiner

*Primary Examiner* — Brian J. Gillis
*Assistant Examiner* — Chhian (Amy) Ling
(74) *Attorney, Agent, or Firm* — Gilbert Harmon, Jr.

(57) ABSTRACT

In an approach to targeted notification, a computing device receives a user input comprising a notification for publication. The computing device receives a user input defining a recipient list. The computing device generates a recipient list based on the user input defining the recipient list, wherein the recipient list comprises one or more of all first level contacts, all members of a community, a defined subset of first level contacts, and a defined subset of members of the community. The computing device publishes the notification to one or more recipients based on the refined recipient list.

20 Claims, 3 Drawing Sheets

COGNITIVE AND CONTEXT DRIVEN NOTIFICATION GENERATION ON A COLLABORATIVE PLATFORM

TECHNICAL FIELD OF THE INVENTION

The present disclosure relates generally to the field of social media, and more particularly to communication on collaborative platforms.

BACKGROUND OF THE INVENTION

Conventional technology allows for instant one-to-one notification on a collaborative platform such as a microblog system. For example, an '@personname' distribution indicator can be used to direct a one-to-one notification at a specific recipient.

Conventional technology enables collective communications based on, e.g., the Lightweight Directory Access Protocol (LDAP), which allows LDAP-aware client programs to ask an LDAP server to look up contact information for individuals or groups, and Public Distribution Lists (PDL) or templates supported by LDAP.

SUMMARY

Embodiments of the present invention disclose a computer-implemented method, a computer program product, and a computer system for targeted notification. A computing device receives a user input comprising a notification for publication. The computing device receives a user input defining a recipient list. The computing device generates a recipient list based on the user input defining the recipient list, wherein the recipient list comprises one or more of all first level contacts, all members of a community, a defined subset of first level contacts, and a defined subset of members of the community. The computing device publishes the notification to one or more recipients based on the refined recipient list.

DETAILED DESCRIPTION

Embodiments described herein can be used to direct a one-to-one (or "targeted") notification at a dynamically generated list of recipients spanning one or more communities.

Embodiments of the present invention may include one or more of the following features, attributes, and/or advantages: (i) a mechanism for reaching out to all first level network contacts in an instant notification mode; (ii) facilitation of outreach, by a publisher, to established groups in an organization, such as all managers or all reportees; (iii) facilitation of instant notification of all team members or employees or contacts in a network; (iv) promotion of flatter structures and reduction of barriers to effective and instant communication to a desired group in a timely manner; (v) facilitation of quick posting on a social collaboration platform by obviating the need to compile a list of participants, some of whom may not be known by a poster at the time of posting; (vi) protection against missing of important notifications by interested participants; (vii) promotion of discussion and collaboration on a social platform; (viii) a possibility of extending the service to include other dynamic groups across levels in an organization or network; (ix) various advantages over static LDAP comparisons; (x) best function when the mix of users is heterogeneous; and/or (xi) a superior alternative to email-based solutions that require directory level groups or custom mail-lists that require maintenance overhead.

Figure 1:
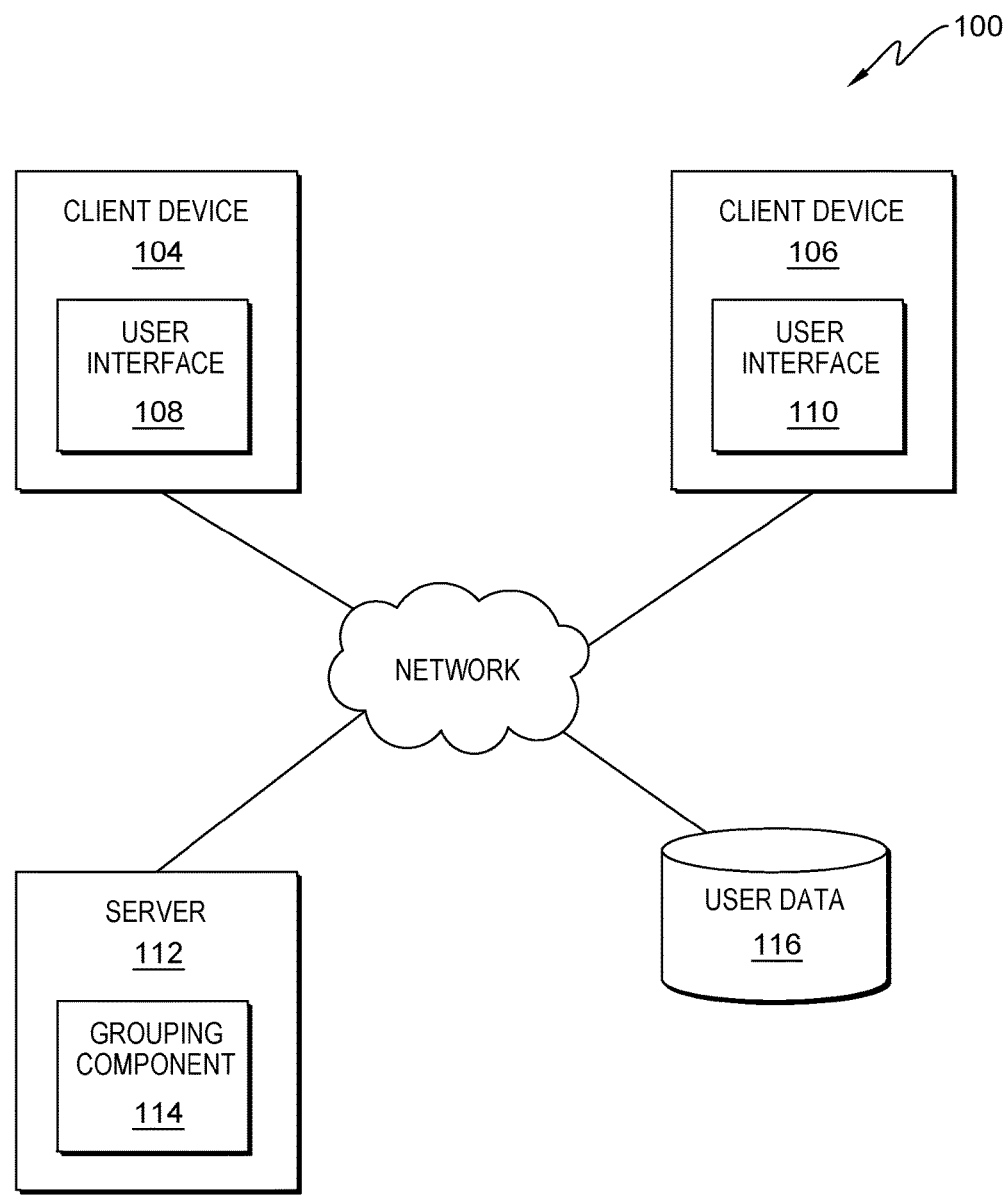
FIG. 1 is a functional block diagram of an exemplary computing environment, in accordance with an embodiment of the present invention.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes client device 104 and client device 106, which can be interconnected with each other, server 112, and other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications among client device 104, client device 106, and other computing devices (not shown) within computing environment 100.

Client device 104 and client device 106 can each be any programmable electronic device capable of executing machine-readable instructions and communicating with each other and with other devices over network 102, in accordance with an embodiment of the present invention. Client device 104 and client device 106 can be, but need not be, similar devices. For example but without limitation, client device 104 can be a smartphone and client device 106 can be a laptop computer, or vice versa.

Client device 104 and client device 106 respectively include user interface 108 and user interface 110. User interfaces 108, 110 provide an interface between a user of client device 104 (not shown), also referred to herein as the "sender," and a user of client device 106 (not shown), also referred to herein as the "recipient," and between the sender and the recipient and client device 104 and client device 106, respectively. User interface 108 and user interface 110 can each be a graphical user interface (GUI) or a web user interface (WUI) and can display text, documents, web browser windows, user options, application interfaces, and instructions for operation, and include the information (such as graphic, text, and sound) that a program presents to a user and the control sequences the user (e.g., the sender) employs to control the program (e.g., grouping component 114, described herein).

In an embodiment, server 112 allows for remote performance of steps of a targeted notification method by grouping component 114, as described herein.

Client device 104, client device 106, and/or server 112 can include internal and external hardware components, as depicted and described in further detail with reference to FIG. 3.

Grouping component 114, responsive to the sender composing a notification for publication, determines one or more recipients of the notification based, at least in part, on user data 116.

User data 116 can include predefined data and/or contextual data, such as but not limited to data associated with:
(1) Specific role or function in an enterprise (e.g., status as an employee of the enterprise);
(2) Membership in a specific community (e.g., social networks owned by LinkedIn Corporation, Twitter, Inc.); and/or
(3) User influence and/or other defined metrics.

For example but without limitation, user data 116 can include standard profile data associated with the sender and/or the recipient; and contextual data, such as whether or not the recipient responded to a particular forum post.

In an embodiment, grouping component 114 can determine a list of recipients comprising:
(1) All first level contacts, defined as all direct connections in a social graph (also referred to herein as a "profile" or "network") of the sender, i.e., his or her direct connections across one or more individual communities, wherein an enterprise connections platform, Twitter, and LinkedIn would each be non-limiting examples of a community;
(2) All members of a community, regardless of whether the members are direct connections of the sender;
(3) A combination of (1) and (2); and/or
(4) A subset of (1) and/or (2), defined as first levels contacts and/or members of a community that meet one or more trigger criteria (described herein with reference to FIG. 2).

In an embodiment, grouping component 114 can determine the list of recipients: (i) dynamically at the time of publication; (ii) based on context (e.g., based on trigger criteria); (iii) without any active maintenance on the side of client device 104; (iv) based on one or more of a best graph traversal method for the sender's profile (e.g., breadth first search) and the open graph protocol (ograph) based entity model; (v) independently of any LDAP, enterprise deployment model, specific social media platform topology, and/or underlying directory (e.g., in the case of federated repositories); and/or (vi) in the context of a social site or system supported by federated identity management, e.g., consuming information that is available for a given federated profile.

Figure 2:
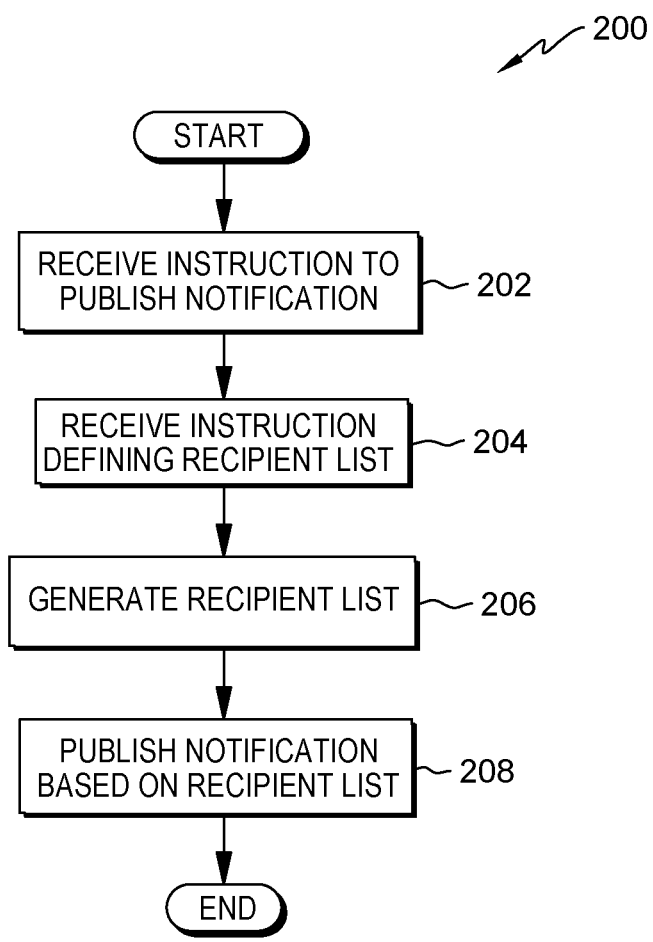
FIG. 2 is a flowchart depicting steps of a targeted notification method, in accordance with an embodiment of the present invention.

FIG. 2 is a flowchart 200 depicting operational steps of a targeted notification method, in accordance with an embodiment of the present invention.

In step 202, grouping component 114 receives a user input comprising a notification for publication.

In step 204, grouping component 114 receives an instruction from the sender defining a recipient list. For example but without limitation, the instruction can take the form of a distribution indicator such as a symbol (e.g., @, #, $) associated with the notification. A distribution indicator can include, but is not limited to including, an accelerator used by an underlying social platform and consistent with underlying social software, or another accelerator used to refer to a person or object within a network or community.

In step 206, grouping component 114 determines a recipient list based on the instruction received in step 204. The list of recipients can vary at any given time based on, for example but without limitation, members having joined a community or left a community (e.g., deleted or deactivated a profile).

In an embodiment, grouping component 114 can determine the recipient list based on a graph traversal method. One skilled in the art will recognize that different graph traversal methods can be used in different embodiments, and that attributes of the sender's profile can be taken into consideration when selecting a graph traversal method.

In an embodiment, responsive to the sender having defined the recipient list to include first level contacts, grouping component 114 can use an ograph based entity model to determine first level contacts.

In an embodiment, responsive to the sender having defined the recipient list to include a context, grouping component 114 can determine the recipient list based on one or more trigger criteria. Trigger criteria can include, but are not limited to including, the recipient(s) having collaborated in a specific forum post, the recipient(s) having responded to a specific forum post, and the recipient(s) having recommended or liked a particular forum post. In non-limiting examples: (i) the distribution indicator @JohnDoe-contacts triggers notification of all first level contacts of the sender; (ii) the distribution indicator @my-contacts triggers notification of all first level contacts of the sender on the social networking site Twitter; (iii) the distribution indicator @all in a status update triggers notification of all first level contacts of the sender on an enterprise connections platform; (iv) distribution indicators such as @my-reportees, @JohnDoe-reportees, or @JohnDoe-contacts trigger notification of a subset of members on an enterprise connections platform; and/or (v) distribution indicators such as @AllCollaboratingForumPost, @AllRepliedToForumPost, and/or @AllRecommendingForumPost trigger notification of members of a community who collaborated in a specific forum post, members who responded to a specific forum post, and/or members who recommended or liked a particular forum post, respectively.

In step 208, grouping component 114 publishes the notification to the recipient(s) indicated by the recipient list generated in step 206. For example, grouping component 114 sends the notification to the user of client device 106, if the user of client device 106 is indicated by the refined recipient list.

Figure 3:
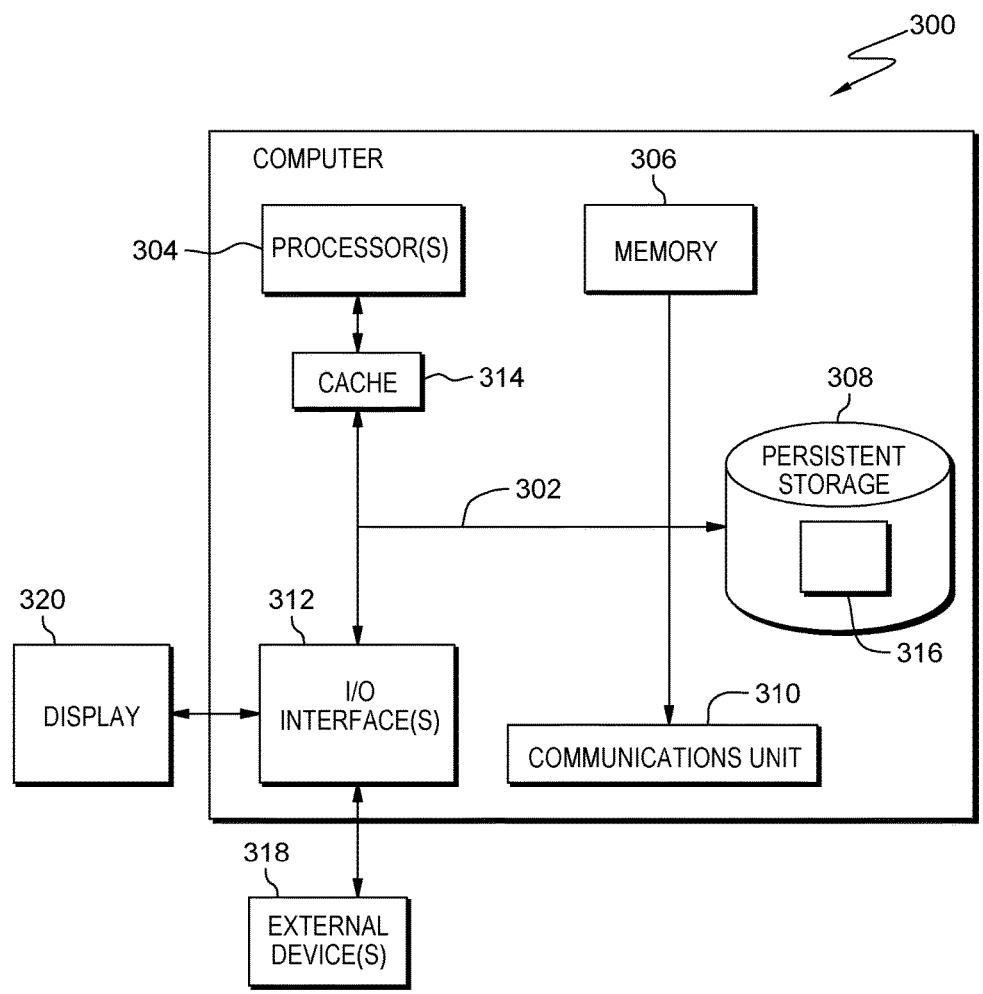
FIG. 3 is a block diagram of components of a computing device in FIG. 1 executing a targeted notification program, in accordance with an embodiment of the present invention.

FIG. 3 depicts a block diagram 300 of components of a computer, e.g., server 112 in computing environment 100, in accordance with illustrative embodiments of the present invention. It should be appreciated that FIG. 3 provides only an illustration of one implementation and does not imply any limitations with regard to the environments in which different embodiments may be implemented. Many modifications to the depicted environment may be made.

Block diagram 300 includes communications fabric 302, which provides communications between computer processor(s) 304, memory 306, persistent storage 308, communications unit 310, and input/output (I/O) interface(s) 312, and cache 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) and cache memory 314. In general, memory 306 can include any suitable volatile or non-volatile computer readable storage media. Cache 314 is a fast memory that enhances the performance of computer processor(s) 304 by holding recently accessed data, and data near accessed data, from memory 306.

Program instructions and data used to practice embodiments of the invention, referred to collectively as component(s) 316, are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. Communications unit 310 can include one or more network interface cards. Communications unit 310 can provide communications through the use of either or both physical and wireless communications links. Component(s) 316 can be downloaded to persistent storage 308 through communications unit 310.

I/O interface(s) 312 allows for input and output of data with other devices that may be connected to server 112. For example, I/O interface 312 can provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., component(s) 316, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for targeted notification, the method comprising:
   receiving, by one or more computer processors, a user input comprising a notification for publication;
   receiving, by one or more computer processors, a user input defining a recipient list;
   generating, by one or more computer processors, a recipient list based on the user input defining the recipient list, wherein the recipient list comprises first level contacts and members of a community, wherein the first level contacts comprises all the first level contacts or a subset of the first level contacts, wherein the members of the community comprise all the members of a community or a defined subset of the members of the community, and wherein the refined recipient list is generated dynamically at publishing time based on members having joined or left the community; and
   publishing, by one or more computer processors, the notification to one or more recipients based on the refined recipient list.

2. The computer-implemented method of claim 1, wherein the first level contacts comprise direct connections in one or more communities.

3. The computer-implemented method of claim 1, wherein generating the recipient list further comprises:
   determining, by one or more computer processors, a graph traversal method based on attributes of a user profile, wherein the user profile comprises first level contacts of the user; and
   applying, by one or more computer processors, the graph traversal method to generate the list of recipients.

4. The computer-implemented method of claim 3, wherein the recipient list is generated based on breadth first search.

5. The computer-implemented method of claim 1, wherein the recipient list is generated based on an open graph protocol entity model.

6. The computer-implemented method of claim 1, wherein the subset comprises one or more of the first level contacts who meet one or more trigger criteria or one or more of the members who meet one or more trigger criteria.

7. The computer-implemented method of claim 1, wherein the user input defining the recipient list comprises a distribution indicator associated with the notification.

8. A computer program product for targeted notification, the computer program product comprising:
   one or more computer readable storage media and program instructions stored on the one or more computer readable storage media, the program instructions comprising:
   program instructions to receive receiving a user input comprising a notification for publication;
   program instructions to receive a user input defining a recipient list;
   program instructions to generate a recipient list based on the user input definingthe recipient list, wherein the recipient list comprises first level contacts and members of a community, wherein the first level contacts comprises all the first level contacts or a subset of the first level contacts, wherein the members of the community comprise all the members of a community or a defined subset of the members of the community, and wherein the refined recipient list is generated dynamically at publishing time based on members having joined or left the community; and
   publishing, by one or more computer processors, the notification to one or more recipients based on the refined recipient list.

9. The computer program product of claim 8, wherein the first level contacts comprise direct connections in one or more communities.

10. The computer program product of claim 8, wherein program instructions to generate the recipient list further comprise:
 program instructions to determine determining a graph traversal method based on attributes of a user profile, wherein the user profile comprises first level contacts of the user; and
 program instructions to apply the graph traversal method to generate the list of recipients.

11. The computer program product of claim 10, wherein the recipient list is generated based on breadth first search.

12. The computer program product of claim 8, wherein the recipient list is generated based on an open graph protocol entity model.

13. The computer program product of claim 8, wherein the subset comprises one or more of the first level contacts who meet one or more trigger criteria or one or more of the members who meet one or more trigger criteria.

14. The computer program product of claim 8, wherein the user input defining the recipient list comprises a distribution indicator associated with the notification.

15. A computer system for targeted notification, the computer system comprising:
 one or more processors;
 one or more computer readable storage media; and
 program instructions stored on the one or more computer readable storage media for execution by at least one of the one or more processors the program instructions comprising:
  program instructions to receive receiving a user input comprising a notification for publication;
  program instructions to receive a user input defining a recipient list;
  program instructions to generate a recipient list based on the user input definingthe recipient list, wherein the recipient list comprises first level contacts and members of a community, wherein the first level contacts comprises all the first level contacts or a subset of the first level contacts, wherein the members of the community comprise all the members of a community or a defined subset of the members of the community, and wherein the refined recipient list is generated dynamically at publishing time based on members having joined or left the community; and
  publishing, by one or more computer processors, the notification to one or more recipients based on the refined recipient list.

16. The computer system of claim 15, wherein the first level contacts comprise direct connections in one or more communities.

17. The computer system of claim 15, wherein program instructions to generate the recipient list further comprise:
 program instructions to determine determining a graph traversal method based on attributes of a user profile, wherein the user profile comprises first level contacts of the user; and
 program instructions to apply the graph traversal method to generate the list of recipients.

18. The computer system of claim 17, wherein the recipient list is generated based on breadth first search.

19. The computer system of claim 15, wherein the recipient list is generated based on an open graph protocol entity model.

20. The computer system of claim 15, wherein the subset comprises one or more of the first level contacts who meet one or more trigger criteria or one or more of the members who meet one or more trigger criteria.

* * * * *